United States Patent
Gustafson et al.

(10) Patent No.: US 8,199,425 B1
(45) Date of Patent: Jun. 12, 2012

(54) METHOD TO REPLACE GAS IN A DISK DRIVE

(75) Inventors: John R. Gustafson, Los Gatos, CA (US); Michael G. Choy, Los Altos, CA (US); Joseph A. Methe, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 427 days.

(21) Appl. No.: 12/475,298

(22) Filed: May 29, 2009

(51) Int. Cl.
 *G11B 33/14* (2006.01)
(52) U.S. Cl. .................. 360/97.02; 360/98.02
(58) Field of Classification Search ............... 360/97.02, 360/98.02
 See application file for complete search history.

(56) References Cited

U.S. PATENT DOCUMENTS

| | | |
|---|---|---|
| 6,618,221 B2 | 9/2003 | Gillis et al. |
| 6,644,362 B2 | 11/2003 | Bernett |
| 6,646,821 B2 | 11/2003 | Bernett et al. |
| 6,683,747 B2 | 1/2004 | Bernett |
| 6,785,082 B2 | 8/2004 | Fiorvanti et al. |
| 6,785,089 B2 | 8/2004 | Bernett et al. |
| 6,819,517 B2 | 11/2004 | Fioravanti et al. |
| 6,831,811 B1 * | 12/2004 | Andrikowich et al. .... 360/97.02 |
| 6,898,043 B2 | 5/2005 | Fioravanti |
| 6,914,742 B1 | 7/2005 | Fioravanti et al. |
| 6,999,262 B2 | 2/2006 | Han et al. |
| 7,199,963 B2 | 4/2007 | Fukushima |
| 7,271,974 B2 | 9/2007 | Fukuyama et al. |
| 7,398,590 B1 | 7/2008 | Mann et al. |
| 7,408,737 B2 | 8/2008 | Fukushima et al. |
| 2003/0089417 A1 | 5/2003 | Bernett |
| 2006/0023339 A1 | 2/2006 | Fukuyama et al. |
| 2006/0044675 A1 | 3/2006 | Fukushima et al. |

\* cited by examiner

*Primary Examiner* — Jami M Valentine

(57) ABSTRACT

A method to at least temporarily replace air with an alternative gas in a first disk drive having a breather filter port is disclosed. A first disk drive is placed in a chamber, which is then evacuated to establish a sub-ambient chamber air pressure. Air bleeds out of the first disk drive through its breather filter port during a first period, until an internal pressure within the first disk drive reaches a reduced internal air pressure that is less than one third the first disk drive's initial internal air pressure. The chamber is then filled with the alternative gas. The alternative gas bleeds into the first disk drive through the breather filter port during a second period, until the internal pressure within the first disk drive reaches a restored internal gas pressure that is in the range 0.5 to 1.25 times the initial internal air pressure.

20 Claims, 3 Drawing Sheets

200

212 Place the first disk drive in a chamber filled with air, the first disk drive having an initial internal air pressure.

214 Evacuate the chamber to establish a sub-ambient air pressure in the chamber during a first period.

216 Wait, during the first period, for air to bleed out of the first disk drive through its breather filter port until an internal pressure within the first disk drive reaches a reduced internal air pressure that is less than one fourth the initial internal air pressure.

218 Fill the chamber with an alternative gas to establish an alternative gas pressure in the chamber that is higher than the sub-ambient air pressure, during a second period.

220 Wait, during the second period, for the alternative gas to bleed into the first disk drive through its breather filter port until the internal pressure within the first disk drive reaches a restored internal gas pressure that is in the range 0.50 to 1.25 times the initial internal air pressure.

*FIG. 2*

METHOD TO REPLACE GAS IN A DISK DRIVE

FIELD OF THE INVENTION

The present invention relates generally to information storage devices, and in particular to methods for manufacturing disk drive information storage devices.

BACKGROUND

Magnetic hard disk drives are an example of information storage devices. Other information storage devices having some common or similar components or architecture include magneto-optical disk drives, optical disk drives, tape drives, and removable media disk drives.

Now referring to FIG. 1, a typical hard disk drive includes a head disk assembly (HDA) 10 and a printed circuit board assembly (PCBA—not shown in the view of FIG. 1) attached to a disk drive base 26 of a disk drive enclosure 16 of the HDA 10. The HDA 10 includes at least one disk 14a, 14b, and 14c, a spindle motor 30 for rotating the disks, and a head stack assembly (HSA) 32. The disks 14a, 14b, and 14c may be magnetic disks, magneto-optical disks, or optical disks, for example. The PCBA (not shown) includes electronics and firmware for controlling the rotation of the spindle motor 30 and for controlling the position of the HSA 32, and for providing a data transfer channel between the disk drive and its host.

The HSA 32 typically includes at least one head gimbal assembly (e.g. HGA 34). During operation of the disk drive, the HSA rotates to position the HGAs (e.g. HGA 34) adjacent desired information tracks on the surfaces 12a, 12b, 12c of the disks 14a, 14b, and 14c. Each HGA includes a head (to small to be visible in the view of FIG. 1) for reading and writing data from and to an adjacent disk surface (e.g. surfaces 12a, 12b, 12c). In magnetic recording applications, the head typically includes a slider and a magnetic transducer that comprises a writer and a read element. In optical recording applications, the head may include a minor and an objective lens for focusing laser light on to an adjacent disk surface. The slider is separated from the disk by a gas film that is typically referred to as an "air bearing." The term "air bearing" is common because typically the gas is simply air. However, air bearing sliders have been designed for use in disk drive enclosures that contain other gases. For example, an inert gas like helium may be used because it does not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, it may not buffet components within the disk drive as much, which may reduce track misregistration and thereby improve track following capability—facilitating higher data storage densities.

However, it may still be preferable for the disk drive to be air-filled during its operational lifetime. It is well known that disk drive enclosures that are designed to contain helium must be hermetically sealed to prevent an unacceptable rate of helium leakage, and such hermetic sealing may present additional design challenges and cost. For example, undesirable deflection of the top cover of the disk drive enclosure may occur with changes in barometric pressure in hermetically sealed disk drives. By contrast, such deflection may be mitigated in disk drives that contain air and so can include a breather filter (e.g. breather filter 20 having optional shroud feature 22) that allows atmospheric air to bleed into or out of the disk drive enclosure (e.g. disk drive enclosure 16 that includes base 26 and cover 28) through a breather hole (e.g. breather hole 18) to equilibrate the internal pressure within the disk drive with the external ambient air pressure.

In many air-filled disk drive designs, the fluid communication between the interior of the disk drive and the external environment (through the breather filter and breather hole) may also be required to pass through a narrow passage referred to as a "labyrinth" in order to limit the rate of flow and/or diffusion. The term "labyrinth" as used herein does not necessitate turns and bends; rather it refers to a narrow path that is longer than it is wide and restricts the rate of gas diffusion; it might have many turns and bends or it might be straight. The labyrinth may be part of the breather filter, like labyrinth 24 shown in FIG. 1, or alternatively may be fabricated as a groove or depression in the base 26 or cover 28.

One potentially advantageous trade-off that may be stricken between air-filled disk drive designs and helium-filled disk drive designs, is to (A) design the disk drive to operate as air-filled during its useful lifetime, for example so that it can employ a breather filter and breather hole, but (B) temporarily fill the disk drive with an alternative gas like helium during a particular portion of the disk drive manufacturing process (e.g. servo track writing) that may benefit most thereby (e.g. from a temporarily reduced flying height). However, accomplishing this advantageous trade-off requires a practical method to fill and replace the gas within the disk drive enclosure in a high-volume manufacturing environment. One proposed method requires removal of the disk drive top cover, while another requires leaving open a large hole in the disk drive top cover, so that the gas inside may be changed quickly in serial fashion. However, according to such proposed methods the disk drive is in a condition unsuitable for use outside of an artificially clean environment (e.g. a clean room or clean hood). Unfortunately, high-volume manufacturing operations that must be accomplished in clean rooms may be prohibitively burdensome and costly. Thus, there is a need in the art for a practical method to temporarily replace the gas in a disk drive enclosure, which may be suitable for high-volume manufacturing environments.

SUMMARY

A method to at least temporarily replace air with an alternative gas in a first disk drive having a breather filter port, is disclosed and claimed. A first disk drive is placed in a chamber filled with air, the first disk drive having an initial internal air pressure. The chamber is evacuated to establish a sub-ambient air pressure in the chamber during a first period. Air bleeds out of the first disk drive through the breather filter port during the first period until an internal pressure within the first disk drive reaches a reduced internal air pressure that is less than one third the initial internal air pressure. The chamber is then filled with the alternative gas to establish an alternative gas pressure in the chamber that is higher than the sub-ambient air pressure, during a second period. The alternative gas bleeds into the first disk drive through the breather filter port during the second period, until the internal pressure within the first disk drive reaches a restored internal gas pressure that is in the range 0.5 to 1.25 times the initial internal air pressure.

BRIEF DESCRIPTION OF THE DRAWINGS

FIG. 2 depicts a method to replace gas in a disk drive enclosure according to an embodiment of the present invention.

DESCRIPTION OF THE PREFERRED EMBODIMENTS

FIG. 2 is a flow chart depicting a method to replace gas in a disk drive enclosure according to an embodiment of the present invention. In step 212, the first disk drive (which has an initial internal air pressure) is placed in a chamber filled with air. The chamber is large enough to receive at least one disk drive, and is preferably large enough to receive many disk drives. The chamber is sealed well enough to maintain a pressure and composition difference between the gas within and the external environment, considering the continued function of any external gas supplies and pumps.

In step 214, the chamber is evacuated to establish a sub-ambient air pressure in the chamber during a first period. In this regard, "evacuated" does not mean that all air has been removed from the chamber because the sub-ambient pressure is preferably not zero pressure. Otherwise, in many applications the evacuation would require too much time. In step 216, air bleeds out of the first disk drive through its breather filter port during the first period until an internal pressure within the first disk drive reaches a reduced internal air pressure that is less than one third the initial internal air pressure, and in some embodiments preferably less than one tenth the initial air pressure. For example, if the breather filter is a flexible breather filter that includes a gas diffusion labyrinth, the first period may preferably be at least 10 seconds. Alternatively, for example, if the breather filter is a canister breather filter that includes adsorbant carbon, the first period may preferably be at least 2 seconds.

In step 218, the chamber is filled with an alternative gas to establish an alternative gas pressure in the chamber that is higher than the sub-ambient air pressure, during a second period. In most embodiments the alternative gas is not air; preferably it is an inert gas (e.g. helium). Note that the alternative gas pressure is the sum of the partial pressure of the alternative gas in the chamber and the partial pressure of any remaining air within the chamber. In certain embodiments, the alternative gas pressure in the chamber is chosen to be approximately equal to an ambient air pressure that is external to the chamber.

In step 220, the alternative gas bleeds into the first disk drive through its breather filter port during the second period, until the internal pressure within the first disk drive reaches a restored internal gas pressure that is in the range 0.5 to 1.25 times the initial internal air pressure. In certain embodiments the initial internal air pressure is approximately equal to an ambient air pressure that is external to the chamber, so that the restored internal gas pressure is in the range 0.5 to 1.25 times the external ambient pressure. Note that the restored internal gas pressure is the sum of the partial pressure of the alternative gas in the first disk drive and the partial pressure of any remaining air within the first disk drive.

Figure 1:
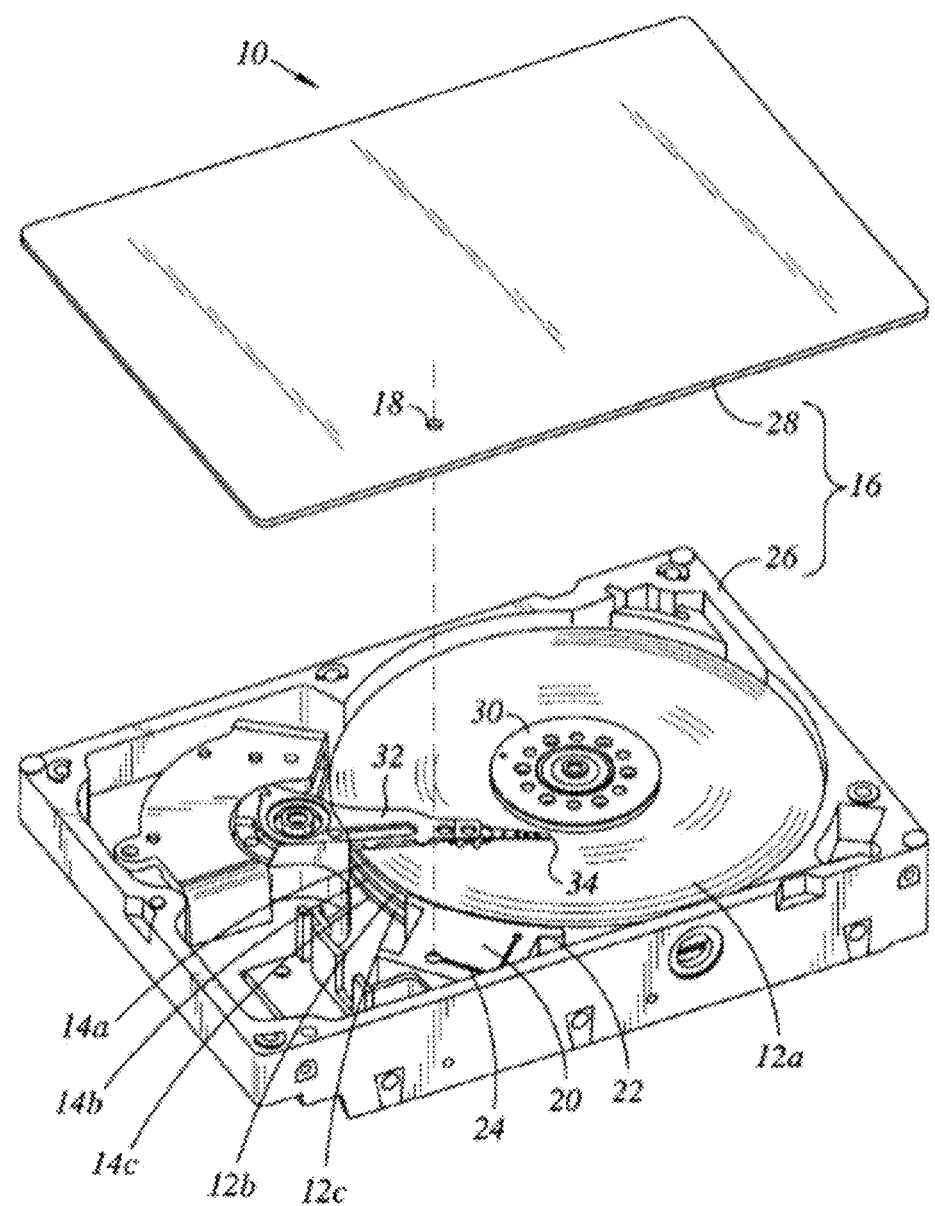
FIG. 1 is a partially exploded view of a prior art magnetic hard disk drive.
Figure 3:
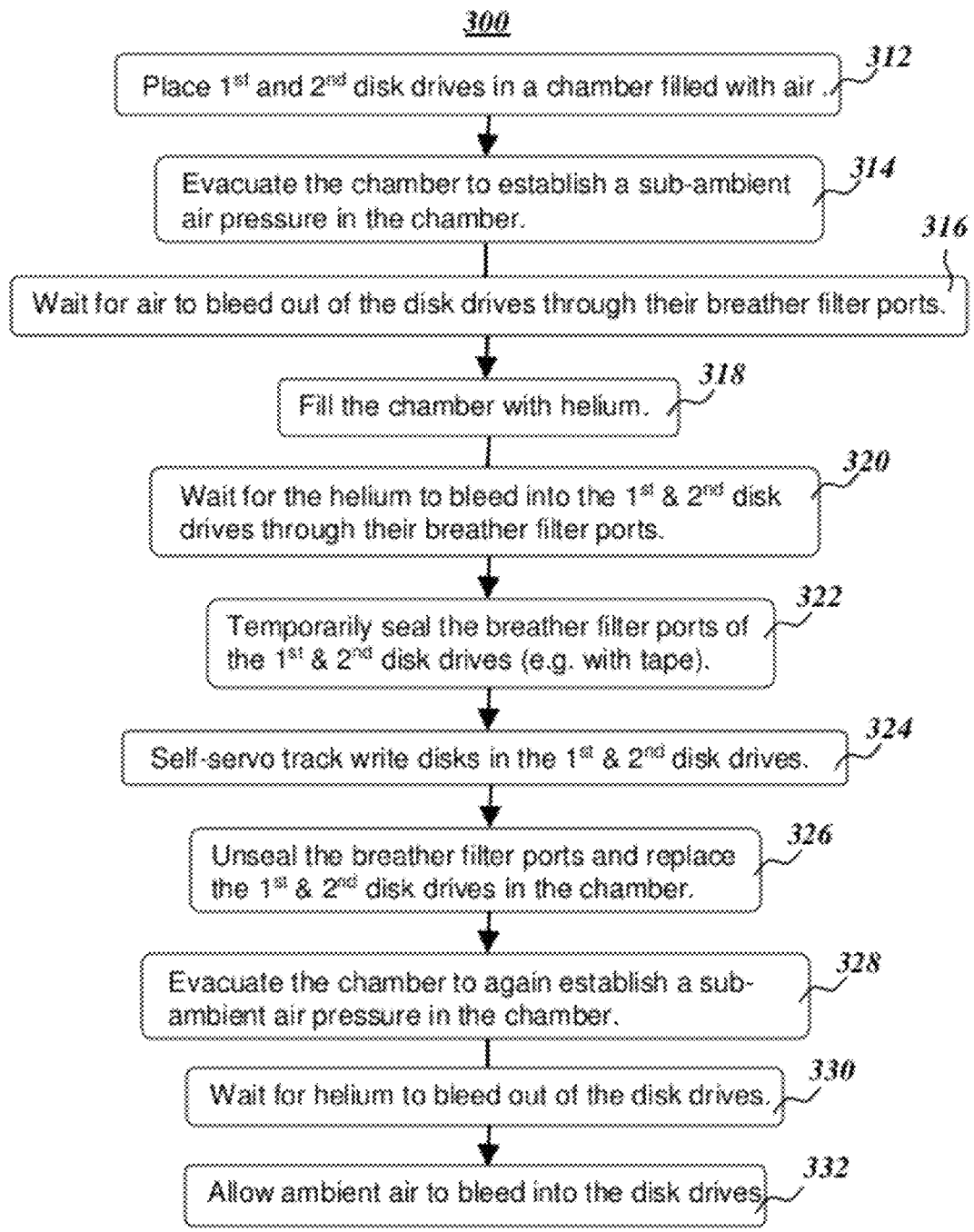
FIG. 3 depicts a method to replace gas in a disk drive enclosure according to another embodiment of the present invention.

Note that the foregoing method for gas replacement allows the relatively slow functions of the chamber (evacuation and gas replacement) to be done in a batch process (multiple disk drives at once) saving manufacturing time, which is important in high volume manufacturing. For example, FIG. 3 is a flow chart depicting a method to replace gas in a disk drive enclosure according to another embodiment of the present invention. In step 312, first and second disk drives (each of which has an initial internal air pressure) are placed in a chamber filled with air. The chamber is large enough to receive at least two disk drives, and is preferably large enough to receive many disk drives. The chamber is sealed well enough to maintain a pressure and composition difference between the gas within and the external environment, considering the continued function of any external gas supplies and pumps.

In step 314, the chamber is evacuated to establish a sub-ambient air pressure in the chamber during a first period. In this regard, "evacuated" does not mean that all air has been removed from the chamber because the sub-ambient pressure is preferably not zero pressure. Otherwise, in many applications the evacuation would require too much time. In step 316, air bleeds out of the first and second disk drives through their respective breather filter ports during the first period until internal pressures within the first and second disk drives reach reduced internal air pressures that are each less than one third the initial internal air pressure, and in some embodiments preferably less than one tenth the initial air pressure.

In step 318, the chamber is filled with helium to establish an alternative gas pressure in the chamber that is higher than the sub-ambient air pressure, during a second period. Note that the alternative gas pressure in this embodiment is the sum of the partial pressure of the helium in the chamber and the partial pressure of any remaining air within the chamber. In certain embodiments, the alternative gas pressure in the chamber is chosen to be approximately equal to an ambient air pressure that is external to the chamber.

In step 320, the helium bleeds into the first and second disk drives through their respective breather filter ports during the second period, until the internal pressures within the first and second disk drives reach restored internal gas pressures that are in the range 0.5 to 1.25 times the initial internal air pressures, respectively. In certain embodiments the initial internal air pressures are approximately equal to an ambient air pressure that is external to the chamber, so that the restored internal gas pressures are each in the range 0.5 to 1.25 times the external ambient pressure. In certain embodiments and as a consequence of a preferred batch process, before the end of the second period, the restored internal pressure within the second disk drive is preferably approximately equal to the initial internal gas pressure of the first disk drive. Note that the restored internal gas pressures are each the sum of the partial pressure of the helium in the subject disk drive and the partial pressure of any remaining air within the subject disk drive.

The breather filter ports of the first and second disk drives may be sealed after their internal pressures reaches the restored internal gas pressures, respectively. For example, in step 322, the breather filter ports of the first and second disk drives are temporarily sealed for example by adhering tape over each of the breather filter ports. A re-usable plug or electromechanical or clip-on device may also be used for this purpose. With the helium (or other alternative gas) sealed in, the first and second disk drives may undergo further manufacturing operations (e.g. self-servo track writing in step 324, further testing, etc) without the need for such manufacturing operations to be conducted within a clean room or other artificially clean environment. This may reduce the time, cost, and/or space required for such manufacturing operations.

In step 326, the breather filter ports are unsealed and the first and second disk drives are replaced in the chamber. Note that replacing the first and second disk drives in the chamber does not require that the chamber be the very same chamber; rather, in many embodiments it would be equivalent for the first and second disk drives to be replaced in another like chamber that can accomplish the same functions (e.g. maintaining a pressure and/or composition difference between the gas inside the chamber versus the external environment). Indeed, having multiple chambers with equivalent function may provide an advantage in a high volume manufacturing environment.

In step 328, the chamber is evacuated to again establish a sub-ambient air pressure in the chamber during a third period. In step 330, helium bleeds out of the first and second disk drives through their respective breather filter ports during the third period. For example, if the breather filter is a flexible breather filter that includes a gas diffusion labyrinth, the third period may preferably be at least 10 seconds. Alternatively, for example, if the breather filter is a canister breather filter that includes adsorbant carbon, the third period may preferably be at least 2 seconds.

Next, the chamber is filled with air until a gas pressure within the chamber is approximately equal to or greater than an ambient air pressure that is external to the chamber, during a fourth period that is subsequent to the third period. In certain embodiments, accomplishing this is associated with opening the chamber to the outside environment. Finally, in step 332, air bleeds into the first and second disk drives through their respective breather filter ports during the fourth period. Preferably, the internal pressures within the first and second disk drives are each approximately equal to the ambient air pressure outside the chamber after the fourth period.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A method to at least temporarily replace air with an alternative gas in a first disk drive having a breather filter port, the method comprising:
    placing the first disk drive in a chamber filled with air, the first disk drive having an initial internal air pressure;
    evacuating the chamber to establish a sub-ambient air pressure in the chamber during a first period;
    waiting, during the first period, for air to bleed out of the first disk drive through the breather filter port until an internal pressure within the first disk drive reaches a reduced internal air pressure that is less than one third the initial internal air pressure;
    filling the chamber with the alternative gas to establish an alternative gas pressure in the chamber that is higher than the sub-ambient air pressure, during a second period; and
    waiting, during the second period, for the alternative gas to bleed into the first disk drive through the breather filter port until the internal pressure within the first disk drive reaches a restored internal gas pressure that is in the range 0.5 to 1.25 times the initial internal air pressure;
    wherein the breather filter port is coupled to a breather filter of the first disk drive.

2. The method of claim 1 wherein the reduced air pressure is one-tenth the initial internal air pressure, or less.

3. The method of claim 1 further comprising placing a second disk drive in the chamber before evacuating the chamber.

4. The method of claim 3 wherein before the end of the first period, an internal pressure within the second disk drive is less than one third the initial internal air pressure.

5. The method of claim 4 wherein before the end of the second period, the restored internal pressure within the second disk drive is approximately equal to the initial internal gas pressure.

6. A method to at least temporarily replace air with an alternative gas in a first disk drive having a breather filter port, the method comprising:
    placing the first disk drive in a chamber filled with air, the first disk drive having an initial internal air pressure;
    evacuating the chamber to establish a sub-ambient air pressure in the chamber during a first period;
    waiting, during the first period, for air to bleed out of the first disk drive through the breather filter port until an internal pressure within the first disk drive reaches a reduced internal air pressure that is less than one third the initial internal air pressure;
    filling the chamber with the alternative gas to establish an alternative gas pressure in the chamber that is higher than the sub-ambient air pressure, during a second period; and
    waiting, during the second period, for the alternative gas to bleed into the first disk drive through the breather filter port until the internal pressure within the first disk drive reaches a restored internal gas pressure that is in the range 0.5 to 1.25 times the initial internal air pressure;
    wherein the breather filter port is coupled to a flexible breather filter that includes a gas diffusion labyrinth.

7. The method of claim 6 wherein the first period is at least 10 seconds.

8. A method to at least temporarily replace air with an alternative gas in a first disk drive having a breather filter port, the method comprising:
    placing the first disk drive in a chamber filled with air, the first disk drive having an initial internal air pressure;
    evacuating the chamber to establish a sub-ambient air pressure in the chamber during a first period;
    waiting, during the first period, for air to bleed out of the first disk drive through the breather filter port until an internal pressure within the first disk drive reaches a reduced internal air pressure that is less than one third the initial internal air pressure;
    filling the chamber with the alternative gas to establish an alternative gas pressure in the chamber that is higher than the sub-ambient air pressure, during a second period; and
    waiting, during the second period, for the alternative gas to bleed into the first disk drive through the breather filter port until the internal pressure within the first disk drive reaches a restored internal gas pressure that is in the range 0.5 to 1.25 times the initial internal air pressure;
    wherein the breather filter port is coupled to a canister breather filter that includes adsorbant carbon.

9. The method of claim 8 wherein the first period is at least 2 seconds.

10. The method of claim 1 wherein the alternative gas is not air and includes helium.

11. The method of claim 1 wherein the initial internal air pressure of the first disk drive is approximately equal to an ambient air pressure that is external to the chamber.

12. The method of claim 1 wherein the alternative gas pressure in the chamber is approximately equal to or greater than an ambient air pressure that is external to the chamber.

13. The method of claim 1 wherein the restored internal gas pressure of the first disk drive is approximately equal to an ambient air pressure that is external to the chamber.

14. A method to at least temporarily replace air with an alternative gas in a first disk drive having a breather filter port, the method comprising:
- placing the first disk drive in a chamber filled with air, the first disk drive having an initial internal air pressure;
- evacuating the chamber to establish a sub-ambient air pressure in the chamber during a first period;
- waiting, during the first period, for air to bleed out of the first disk drive through the breather filter port until an internal pressure within the first disk drive reaches a reduced internal air pressure that is less than one third the initial internal air pressure;
- filling the chamber with the alternative gas to establish an alternative gas pressure in the chamber that is higher than the sub-ambient air pressure, during a second period; and
- waiting, during the second period, for the alternative gas to bleed into the first disk drive through the breather filter port until the internal pressure within the first disk drive reaches a restored internal gas pressure that is in the range 0.5 to 1.25 times the initial internal air pressure;

further comprising sealing the breather filter port after the internal pressure within the first disk drive reaches the restored internal gas pressure.

15. The method of claim 14 wherein sealing the breather filter port comprises adhering a tape over the breather filter port.

16. The method of claim 14 further comprising self-servo track writing a disk in the first disk drive after the breather filter port is sealed.

17. The method of claim 16 further comprising unsealing the breather filter port and replacing the first disk drive in the chamber after the servo track writing, and again evacuating the chamber to establish a second sub-ambient air pressure in the chamber during a third period.

18. The method of claim 17 wherein the third period is at least 10 seconds.

19. The method of claim 17 further comprising filling the chamber with air until a gas pressure within the chamber is approximately equal to or greater than an ambient air pressure that is external to the chamber, during a fourth period that is subsequent to the third period.

20. The method of claim 19 wherein the internal pressure within the first disk drive is approximately equal to the ambient air pressure after the fourth period.

* * * * *